(12) United States Patent
Maruyama (10) Patent No.: US 6,654,184 B1
(45) Date of Patent: Nov. 25, 2003

(54) METHOD FOR DESIGNING DIFFRACTIVE LENS

(75) Inventor: Koichi Maruyama, Saitama-ken (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/455,487

(22) Filed: Dec. 6, 1999

(30) Foreign Application Priority Data

Dec. 9, 1998 (JP) .......................................... 10-350387

(51) Int. Cl.$^7$ .......................... G02B 3/08; G02B 13/12; G02B 13/10
(52) U.S. Cl. ........................ 359/742; 359/570; 359/569
(58) Field of Search ............................... 359/565, 566, 359/569, 570, 742

(56) References Cited

U.S. PATENT DOCUMENTS

| | | | | |
|---|---|---|---|---|
| 5,218,471 A | * | 6/1993 | Swanson et al. ............. | 359/565 |
| 5,978,140 A | * | 11/1999 | Maruyama ................... | 359/659 |
| 6,069,737 A | * | 5/2000 | Fetzer et al. ................. | 359/558 |
| 6,351,443 B1 | * | 2/2002 | Freeman ................. | 369/112.07 |

FOREIGN PATENT DOCUMENTS

| | | | | |
|---|---|---|---|---|
| JP | 10133104 | | 5/1998 | |
| JP | 10186231 | | 7/1998 | |
| JP | P2000-171704 A | * | 6/2000 | ........... G02B/13/18 |

OTHER PUBLICATIONS

D.W. Prather and S. Shi: :Hybrid Scalar–Vector Method for the Analysis of Electrically Large Finite Aperiodic Diffractive Optical Elements; Proceedings of SPIE, vol. 3633, pp. 2–13 (1999).*

A. Hermershmidt, H.J. Eichler, S. Teiwes, and J. Schwartz; "Design of Diffractive Beam–Shaping Elements for Non–Uniform Illumination Waves"; Proceedings of SPIE, vol. 3291, pp. 40–48 (1998).*

L.N. Hazra, Y. Han, and C.A. Delisle; "Kinoform lenses: Sweatt Model and Phase Function"; Optics–Communications (Netherlands); vol. 117; No. 1–2; pp. 31–36 (1995).*

W. C. Sweatt; "Describing Holographic Optical Elements as Lenses"; Journal of the Optical Society of America; vol. 67, No. 6 (1977).*

* cited by examiner

Primary Examiner—David N. Spector
(74) Attorney, Agent, or Firm—Greenblum & Bernstein, P.L.C.

(57) ABSTRACT

A method for designing a diffractive lens that separates an incident light beam into a plurality of beams and condenses the respective separated beams is provided. The method includes: defining an expression of a diffractive surface having a beam converging function based on given focal length; defining an expression of a diffractive surface having a beam separating function that separates a light beam into plural orders of diffractive light based on said given focal length, a given number of separated light and a given distance between focusing points; and superimposing the defined expressions of the diffractive surface having the beam converging function and the diffractive surface having the beam separating function to determine a shape of the diffractive lens having a plurality of optical functions.

9 Claims, 4 Drawing Sheets

METHOD FOR DESIGNING DIFFRACTIVE LENS

BACKGROUND OF THE INVENTION

The present invention relates to a method for designing a diffractive lens that has a combination of a plurality of functions such as beam converging, beam separating and aberration correcting.

Holography technology has been used for designing the diffractive lens that has functions of beam converging and beam separating. For Instance, a diffractive lens that converges a light beam from a light source into three focusing points can be made by recording interference pattern between light from a point corresponding to the light source and divergent light from points corresponding to the three focusing points into a hologram plate. The interference pattern is formed by the interference of actual light wave or computer simulation. The hologram plate converges the light from the same light source into the three focusing points.

A phase function method is known to design a diffractive surface having a beam converging function and an aberration correcting function. In this method, additional optical path length added by the diffractive surface is represented as a mathematical function of a position on the surface. The aberration can be corrected by adjusting coefficients of the function.

However, since it is difficult to control the light amount distribution at the respective focusing points for the holograph technology, it cannot be used for designing a diffractive lens that separates a light beam into equal portions for the respective focusing points.

On the other hand, since the phase function method evaluates aberration of only one diffractive order light, it cannot determine the surface shape when the diffractive surface has the beam separating function.

In general, a lens design requires an evaluation method to optimize the lens characteristics. Many evaluation methods running on the computer have been developed for a refractive optical system, and they can be utilized in the design of a diffractive lens when the diffractive lens has a single optical function. For instance, the ultra high index method using Sweatt model is able to design the optical system Including a diffractive lens by lens design computer programs developed for refractive optical systems.

However, the evaluation methods of the lens design computer programs cannot evaluate the diffractive lens having a combination of a plurality of optical functions, which increases difficulty of the diffractive lens design.

SUMMARY OF THE INVENTION

It is therefore an object of the present invention to provide a method for designing a diffractive lens, which is effective for designing a diffractive lens having a combination of a plurality of functions such as a combination of beam converging, beam separating and aberration correcting functions.

For the above object, according to the present invention, there is provided a method for designing a diffractive lens having a combination of a plurality of optical functions, which includes:

defining an expression of each of a plurality of diffractive surfaces, the plurality of diffractive surfaces having the plurality of optical functions, respectively; and superimposing the defined expressions of the plurality of diffractive surfaces to determine a shape of the diffractive lens, a diffractive lens formed to have the shape having the combination of the plurality of optical functions.

With this construction, each of the diffractive surfaces has a simple optical function and the diffractive lens can be considered as an optical system having the plural diffractive surfaces, which enables evaluation, such as ray tracing, by lens design computer programs developed specifically for a refractive optical system. Thus, the diffractive lens having a combination of a plurality of optical functions can easily be designed. The method according to the present invention is particularly effective for designing a diffractive lens having a beam converging function, a beam separating function and an aberration correcting function.

The expression of each diffractive surface is defined as phase distribution or an actual shape, i.e., distribution of a thickness along an optical axis direction.

In particular, according to the present invention, there is provided a method for designing a diffractive lens that separates an incident light beam into a plurality of beams and condenses the respective separated beams, which includes:

defining an expression of a diffractive surface having a beam converging function based on given focal length;

defining an expression of a diffractive surface having a beam separating function that separates a light beam into plural orders of diffractive light based on said given focal length, a given number of separated light and a given distance between focusing points;

superimposing the defined expressions of the diffractive surface having the beam converging function and the diffractive surface having the beam separating function to determine a shape of the diffractive lens having a combination of a plurality of optical functions.

The superimposing step preferably includes:

calculating a first phase distribution by mapping decimal parts of an optical path difference function, which is expressed in the unit wavelength and represents the defined expression of the diffractive surface having the beam separating function, on a reference phase pattern that represents a variation of phase shifting amount within one pitch to separate a light beam into a plurality of equal portions;

calculating a second phase distribution that corresponds with decimal parts of an optical path difference function, which is expressed in the unit wavelength and represents the defined expression of the diffractive surface having the beam converging function; and calculating the shape of the diffractive lens by superimposing the first and second phase distributions and converting the superimposed result into the actual shape.

The actual shape of the diffractive surface may have a plurality of concentric rings each of which has a wedge sectional shape. The first and second phase distribution represent the entire area of the diffractive surface including the plural rings, while the reference phase pattern defines the variation of the phase shift amount within the single ring. The reference phase pattern can be predetermined based on the given number of separated light and the given distance between focusing points.

Further, the method may include a step for defining an expression of a diffractive surface having an aberration correcting function that corrects aberration at the respective focusing points caused when the diffractive surfaces having the beam converging function and the beam separating function are superimposed. In such a case, the expressions of the diffractive surfaces having the beam converging function, the beam separating function and the aberration correcting function are superimposed in the superimposing step to define the final shape of the diffractive lens.

The diffractive surface having the aberration correcting function is preferably defined to correct at least coma. The diffractive surface may further correct astigmatism and/or curvature of field.

DESCRIPTION OF THE EMBODIMENTS

Figure 1:
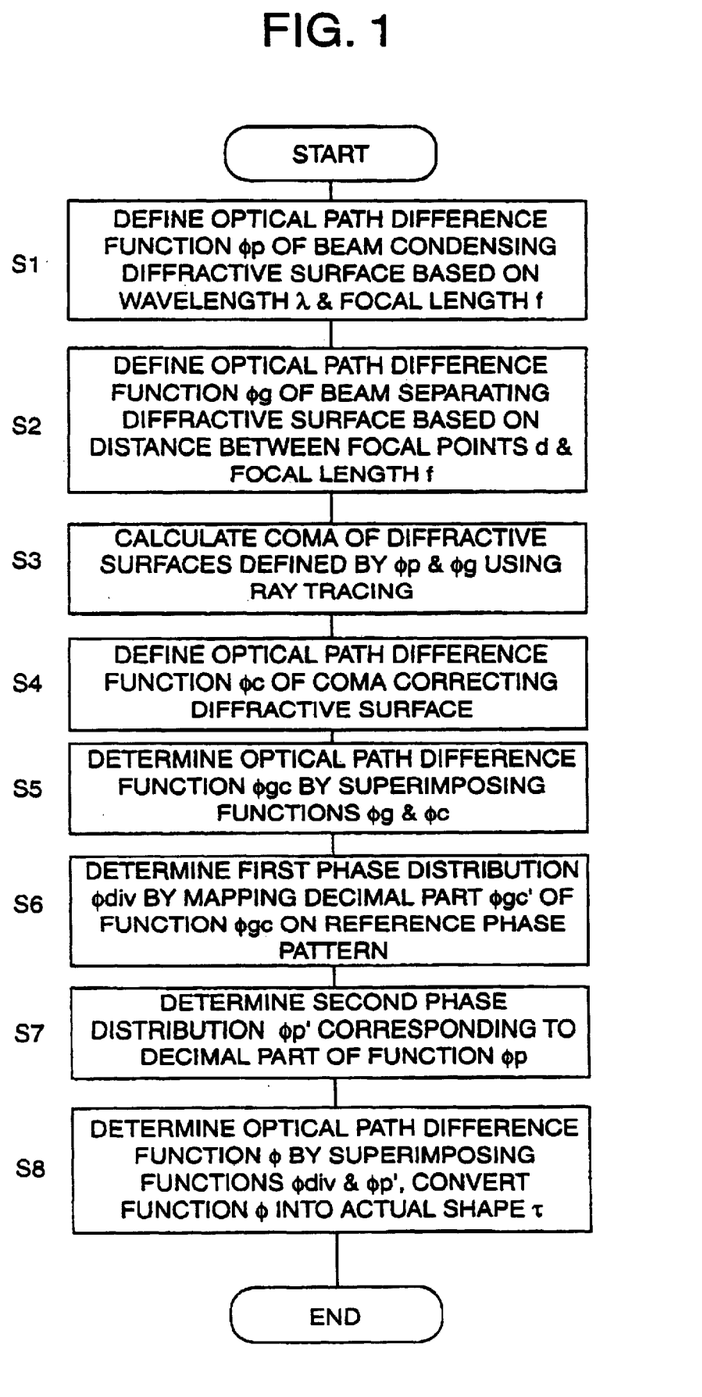
FIG. 1 is an outlined flowchart illustrating a method for designing a diffractive lens according to an embodiment of the present invention.

An embodiment of the method for designing a diffractive lens according to the present invention will be described hereinafter. FIG. 1 is an outlined flowchart showing a method for designing a diffractive lens according to the embodiment. The method of the embodiment is directed to design a diffractive lens that condenses a light beam from a light source into plural focusing points aligned at equal intervals. The diffractive lens has a plurality of optical functions that Include a beam converging function, a beam separating function and an aberration correcting function. The aberration correcting function corrects aberration at the respective focusing points caused by the beam converging function and the beam separating function.

An outline of the design method of the embodiment will be described with reference to FIG. 1. A wavelength $\lambda$, a focal length f, a number of separated light and a distance between the focusing points d are given as specifications for the design. The actual shape of the diffractive lens can be obtained after executions of steps S1 through S8.

In step S1, a diffractive surface having a beam converging function is expressed by an optical path difference function $\phi p$ based on the focal length f and the wavelength $\lambda$. The beam converging diffractive surface is designed as a condenser lens that is corrected for spherical aberration. The optical path difference function $\phi p$ represents an additional optical path length added by diffractive surface as a function of a position on the surface.

In step S2, a diffractive surface having a beam separating function is expressed by an optical path difference function $\phi g$ based on the distance between the focusing points d and the focal length f.

In step S3, coma at the respective focusing points, which is caused by the optical system consisting of the beam converging diffractive surface and the beam separating diffractive surface, is calculated by ray tracing. The coma can be determined according to the optical path difference functions $\phi p$ and $\phi g$.

In step S4, a diffractive surface having an aberration correcting function is expressed by an optical path difference function $\phi c$ that can correct the coma calculated in step S3.

Steps S5 through S8 correspond to superimposing steps in which the expressions of the beam converging diffractive surface, the beam separating diffractive surface and the aberration correcting diffractive surface are superimposed to determine a shape of the final diffractive surface having a combination of a plurality of optical functions.

In step S5, an expression representing a superimposition of the beam separating diffractive surface with the aberration correcting diffractive surface is obtained to define a composed diffractive surface. Specifically, the optical path difference functions $\phi g$ and $\phi c$ are added to each other to determine an optical path difference function $\phi gc$ of the composed diffractive surface.

In step S6, a first phase distribution $\phi div$ is determined by mapping a decimal part $\phi gc'$ of the optical path difference function $\phi gc$ that is expressed in the unit wavelength on a reference phase pattern. The reference phase pattern represents a variation of phase shifting amount within one pitch to separate a light beam into a plurality of equal portions.

In step S7, a second phase distribution $\phi p'$ that is a decimal part of the optical path difference function $\phi p$ that is expressed in the unit wavelength. Steps S6 and S7 may be executed in inverse order.

In step S8, the first and second phase distributions are added to determine an expression of the final diffractive surface. The final diffractive surface is represented by an optical path difference function $\phi$ that is obtained by the addition $\phi div + \phi'$. The optical path difference function $\phi$ is converted into a function $\tau$ that represents an actual shape of the final diffractive surface.

According to the design method of the embodiment, each of the diffractive surfaces has a simple optical function and the diffractive lens can be considered as an optical system having a plurality of diffractive surfaces, which enables evaluation such as ray tracing by lens design computer programs developed specifically for a refractive optical system.

A concrete (i.e. numerical) design sample according to the above method will be described in the order of flowchart of FIG. 1. In the sample, a diffractive lens separates a parallel light beam into zero, first and second diffraction orders and forms three focusing points at a distance of 50 mm from the lens with 2.5 mm intervals. Namely, the specifications of the diffractive lens are: the wavelength $\lambda$=587.56 nm; the focal length f=50 mm; the number of separation is 3; and the distance between the focusing points d=2.5 mm.

Figure 2:
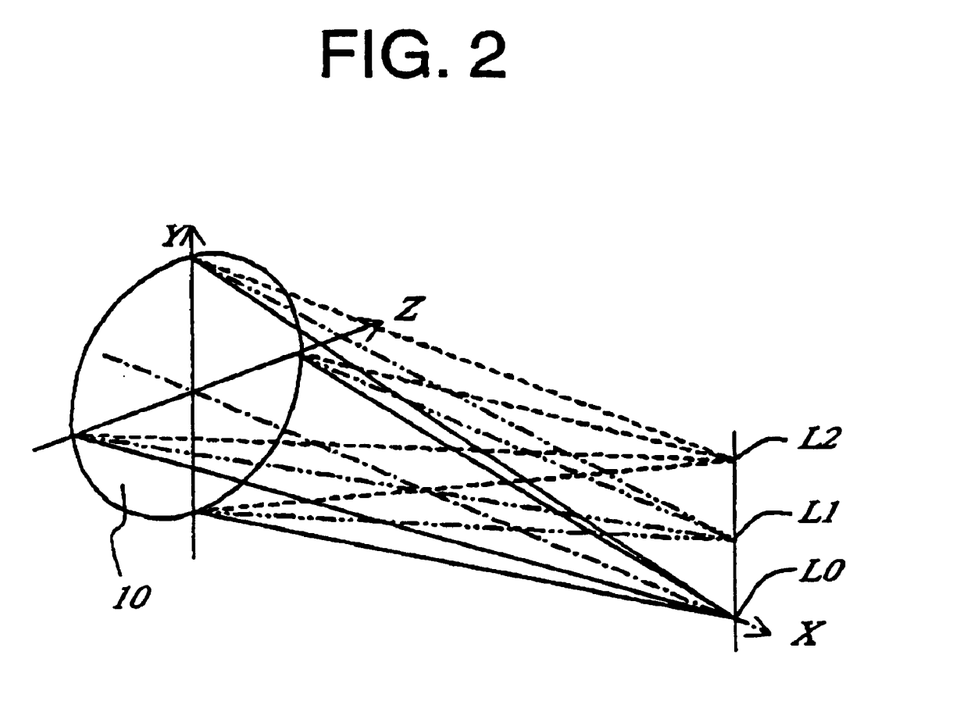
FIG. 2 shows coordinate systems for illustrating the embodiment.

The coordinate systems used in the following calculation are shown in FIG. 2. The optical axis shown by an one-dot chain line is defined as an X-axis. A Y-axis and a Z axis are defined in a plane normal to the X-axis and they are perpendicular to each other. The diffractive surface 10 is located on the Y-Z plane. The focusing point L0 of the zero order diffraction light is positioned on the optical axis, the focusing point L1 of the first order diffraction light is positioned on the point Y=2.5 mm, and the focusing point L2 of the second order diffraction light is positioned on the point Y=5.0 mm.

[Step S1]

An expression of the beam converging diffractive surface is defined in a lens design computer program as a scheme of the optical path difference function $\phi p$ based on the focal length f. The beam converging diffractive surface is designed as a condenser lens that is corrected for spherical aberration and has the focal length of 50 mm for the first order diffraction light. Further, since the beam converging diffractive surface is rotationally symmetrical, the optical path difference function $\phi p$ depends on the Y-Z coordinate.

The beam converging diffractive surface is defined by the ultra high index (UHI) method in this example. In the UHI method, a diffractive surface is represented as a thin film lens or prism having extremely high refractive index so as to enable a diffractive element to be designed and evaluated in the lens design computer program developed for the refractive optical system.

The higher the refractive index is, the higher the simulation accuracy is. However, since calculation accuracy is limited by a system specification of a computer language, the refractive index is determined between 500 and 20000, in general. The refractive index $n_1$ of the beam converging diffractive surface for the first order diffraction light is defined as follows using wavelength $\lambda$:

$$n_1 = \lambda \times 10^i + 1.$$

In this example, i=7 and thus $n_1$=5878.6 [nm]. Further, the diffractive lens that generates such a spherical wavefront is optically equivalent to a hyperboloid whose radius of curvature r and conic constant $\kappa$ are defined as follows in the UHI method:

$$r = f(n_1 - 1) = 2.9378 \times 10^5,$$

$$\kappa = -n_1^2 = -3.4534 \times 10^7.$$

Since the wavefront aberration on the optical axis becomes zero, the optical path difference function $\phi p(Y, Z)$ that represents the beam converging diffractive surface is defined as follows.

$$\phi p(Y, Z) = -\sqrt{f^2 + Y^2 + Z^2} - f$$
$$= -\sqrt{2500 + Y^2 + Z^2} + 50 \quad (\text{unit: mm})$$
$$= -\frac{\sqrt{2500 + Y^2 + Z^2} + 50}{0.00058756} \quad (\text{unit: } \lambda)$$

[Step S2]

In step S2, an expression of the beam separating diffractive surface where the focal length f=50 mm and the distance between the focusing points d=2.5 mm is defined. In this step, a pitch of grating (i.e., spatial frequency $\nu$) and the optical path difference function $\phi g$ of the diffractive surface are determined. The beam separating diffractive surface has a distribution of an optical path difference only in the Y-axis direction, and therefore, the optical path difference function $\phi g$ depends on the Y coordinate.

There is a relationship between an incident angle $\theta$ on the beam separating diffractive surface and an exit angle $\theta'$ therefrom as the following basic formula of the diffraction grating:

$$\sin \theta - \sin \theta' = m\lambda\nu.$$

where m is a diffraction order. The focal length f and the distance between the focusing points d give the following relationship:

$$-f \times \tan \theta' = d \times m,$$

Since f=50.0 and d=2.5, the exit angle $\theta_m'$ of the m-th order diffraction light is found as follows:

$$\tan \theta_m' = -0.05 \, m,$$

$$\theta_m' = -\arctan(0.05 \, m).$$

On the other hand, the incident angle $\theta$ is 0 degrees. Substituting the value of $\theta$ and $\theta_m'$ in the basic formula yields the spatial frequency $\nu$ as follows:

$$0 - \sin(\arctan(-0.05 \, m)) = m \times 0.00058756 \times \nu$$

$$\nu = \frac{\sin(\arctan 0.05)}{0.00058756}$$

$$\nu = 84.992.$$

The beam separating diffractive surface is defined as a thin film prism having ultra high refractive index In the UHI method. The optical path difference function $\phi gm$ of the beam separating diffractive surface for the m-th order diffraction light is defined as follows using an apex angle $\alpha$ of the thin film prism:

$$\phi gm(Y) = \frac{Y \times (n_m - 1)\tan \alpha}{\lambda} = m \times \nu \times Y. \quad (\text{unit: } \lambda)$$

Accordingly, the optical path difference functions for respective diffraction oders are represented as follows:

$$\phi g_0(Y) = 0 \times 84.992 \times Y$$

$$\phi g_1(Y) = 1 \times 84.992 \times Y \quad (\text{unit: } \lambda)$$

$$\phi g_2(Y) = 2 \times 84.992 \times Y \quad (\text{unit: } \lambda)$$

Further, the refractive index $n_m$ for the m-th order diffraction light can be defined as follows in order to ease calculations:

$$n_m = m\lambda \times 10^i + 1.$$

In this example, $\lambda$=587.56 nm and i=7, the refractive index of the thin film prism for the respective diffraction orders are determined as $n_0$=1, $n_1$=5876.6, and $n_2$=11752.2.

Substituting the refractive index $n_m$ into the equation of $\phi g_1(Y)$ yields the apex angle $\alpha$.

$$\phi g_1(Y) = \frac{Y \times (\lambda \times 10^7 + 1 - 1)\tan \alpha}{\lambda} = \nu \times Y$$

$$\tan \alpha = \nu \times 10^{-7}$$

$$\alpha = \arctan(\nu \times 10^{-7})$$

$$\alpha = \arctan(84.992 \times 10^{-7}) = 0.000486966 \quad (\text{unit: degrees})$$

When the beam separating diffractive surface is evaluated by the UHI method, the spatial frequency $\nu$ and the apex angle $\alpha$ are independent of the diffraction order, while the refractive index varies depending on the diffraction order. The value of the optical path difference function varies due to the variation of the refractive index, which enables the evaluations for the respective diffraction orders. The actual shape of the beam separating diffractive surface can be determined as an intermediate shape that is an average of the shapes defined by the optical path difference functions of the necessary diffraction orders. Boundaries on the diffraction grating is determined based on the values for the first order diffraction light.

[Step S3]

The coma is calculated by ray tracing on the lens design computer program based on the obtained data of the beam converging diffractive surface and the beam separating diffractive surface in steps S1 and S2. The coma component W in the wavefront is expressed as follows using a coefficient Wc:

$$W(Y, Z) = WcY(Y^2 + Z^2).$$

[Step S4]

The coma correcting diffractive surface is defined to correct the coma W(Y, Z). The coma can be corrected to shift a rotationally symmetrical fourth order curve in the UHI method. Thus, the phase function that represents the ultra high index thin film is defined to correct the coma. The refractive index for the zero, first and second diffraction orders of the thin film are equal to 1.00, 5876.6 and 11752.2, respectively. Thickness of the thin film lens along the X-axis direction T(Y, Z) is defined using a fourth order aspherical surface coefficient A4 and the shifting amount of the fourth order curve $\Delta$ as follows:

$$\begin{aligned}
T(Y, Z) &= -A4(Y^2 + Z^2)^2 + A4((Y - \Delta)^2 + Z^2)^2 \\
&= -A4((Y^2 + Z^2)^2 - ((Y - \Delta)^2 + Z^2)^2) \\
&= -A4((Y^4 + Z^4 + 2Y^2 Z^2) - ((Y - \Delta)^4 + Z^4 + 2(Y - \Delta)^2 Z^2)) \\
&= -A4((Y^4 + 2Y^2 Z^2) - ((Y - \Delta)^4 + 2(Y - \Delta)^2 Z^2)) \\
&= -A4((Y^4 + 2Y^2 Z^2) - ((Y^2 - 2Y\Delta + \Delta^2)^2 + 2(Y^2 - 2Y\Delta + \Delta^2)Z^2 \\
&= -A4(Y^4 - (Y^2 - 2Y\Delta + \Delta^2)^2 + 2(-2Y\Delta + \Delta^2)Z^2) \\
&= -A4(Y^4 - (Y^4 + 4Y^2\Delta^2 + \Delta^4 - 4Y^3\Delta + 2Y^2\Delta^2 - 4Y\Delta^3 + 2(-2Y\Delta + \Delta^2)Z^2) \\
&= A4(6Y^2\Delta^2 + \Delta^4 - 4Y^3\Delta - 4Y\Delta^3 + 2(-2Y\Delta + \Delta^2)Z^2)
\end{aligned}$$

The shifting amount $\Delta$ is so small that the terms include the second or more orders of $\Delta$ can be omitted as follows:

$$T(Y, Z) = -4 \times A4 \times \Delta Y \times (Y^2 + Z^2).$$

Since the diffractive surface is normal to the X-axis, the optical path difference D is represented as follows:

$$D = T(Y, Z) \times (n_m - 1).$$

Therefore, the terms of $A4 \times \Delta$ in the above equation T(Y, Z) is the value for determining the amount of the coma correction. The magnitudes of the aspherical surface coefficient A4 and the shifting amount $\Delta$ are preferably determined so that both of the magnitude of $\Delta^2$ and the variation of a sag added by the aspherical component become enough small.

In this example, $\Delta = 0.001$ and $A4 = 4.05 \times 10^{-7}$. Thus, the optical path difference function $\phi cm(Y, Z)$ of the coma correcting diffractive surface for the m-th order diffraction light is defined as follows:

$$\begin{aligned}
\phi cm(Y, Z) &= -4 \times A4 \times \Delta \times Y(Y^2 + Z^2) \times (n_m - 1) \\
&= -(1.62 \times 10^{-9}) \times Y(Y^2 + Z^2) \times (n_m - 1) \\
&= -(1.62 \times 10^{-9}) \times Y(Y^2 + Z^2) \times m\lambda \times 10^7 \text{ (unit mm)} \\
&= -0.01.62 \times Y(Y^2 + Z^2) \times m \text{ (unit } \lambda\text{)}
\end{aligned}$$

The processes in steps S1 through S4 define the expressions of the diffractive surfaces for the respective optical functions. Since the lens design computer program for the refractive optical system can evaluate a diffractive surface having a single optical function, each of the defined diffractive surfaces can be evaluated. Further, since the final diffractive surface having all of the intended optical functions is equivalent to the optical system composed of the diffractive surfaces obtained in steps S1 through S4, the lens design computer program can evaluate the optical characteristic of the final diffractive surface by composing the evaluation results of the respective single function diffractive surfaces. If the evaluated result of the final diffractive surface does not meet a required specification, the expressions of the single function diffractive surfaces are changed to optimize the final diffractive surface. Furthermore, additional diffractive surfaces having another optical functions such as an astigmatism correcting function may be defined.

The following optical path difference functions, which are expressed in the unit wavelength, are defined in steps S1 through S4 for the beam converging diffractive surface, the beam separating diffractive surface and the coma correcting diffractive surface, respectively.

Beam converging function:

$$\phi p(Y, Z) = \frac{-\sqrt{2500 + Y^2 + Z^2} + 50}{0.00058756}$$

Beam separating function: $\phi g_1(Y) = 84.992 \times Y$

Coma correcting function: $\phi(Y, Z) = -0.0162 \times Y(Y^2 + Z^2)$

Figure 3:
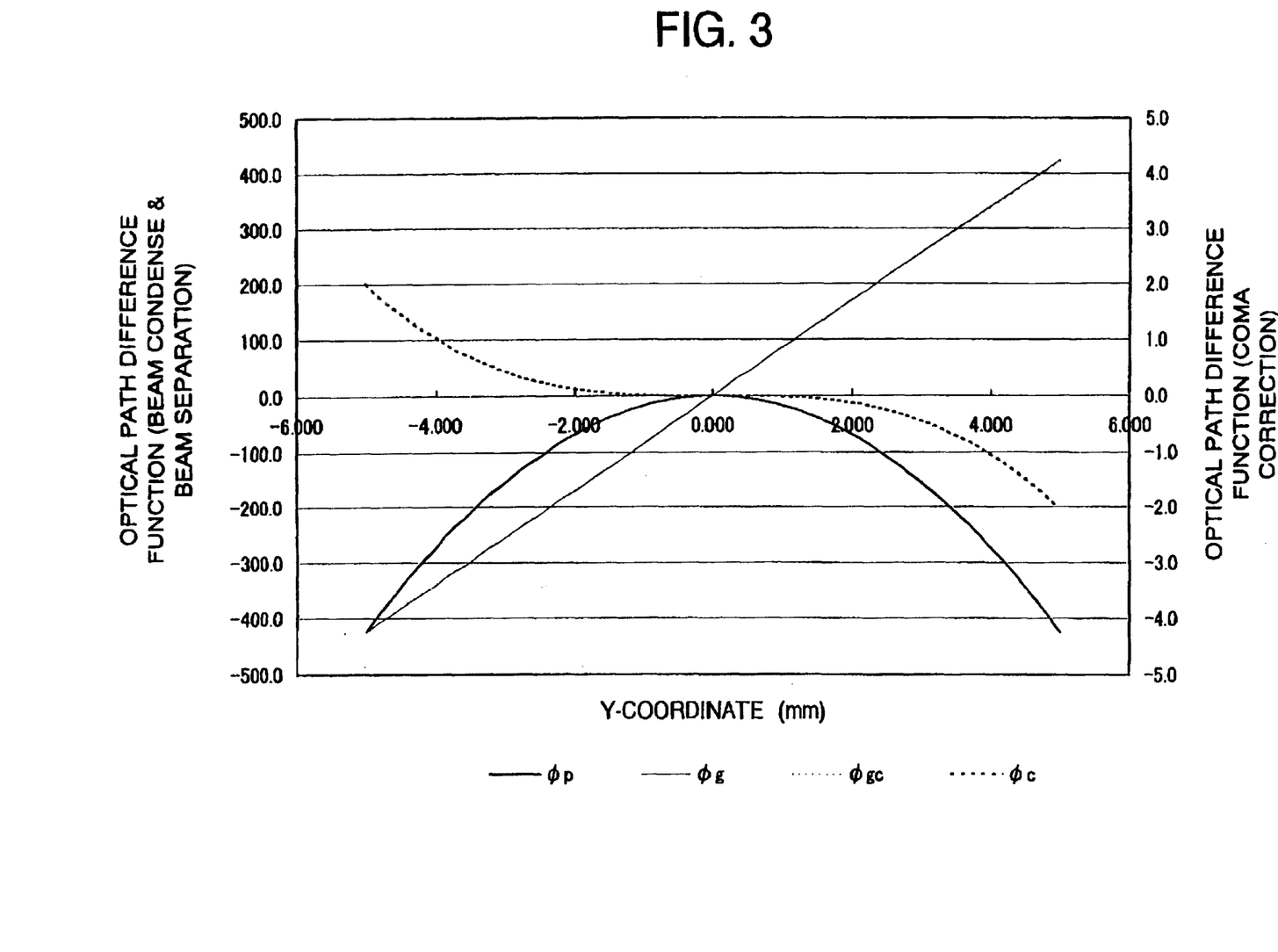
FIG. 3 is a graph showing optical path difference functions of respective diffractive surfaces defined by the method of the embodiment.

Table 1 shows the values of the respective optical path difference functions $\phi p$, $\phi g$, $\phi c$ and $\phi gc$ on the points along the Y-axis (Z=0). The diameter of the sample diffractive lens is 10 mm, the Y coordinate varies from −5.000 to 5.000 at 0.5 mm intervals. FIG. 3 shows the relationships between the Y coordinate and the values of the respective optical path difference functions $\phi p$, $\phi g$, $\phi c$ and $\phi gc$. The vertical axes of the graph represent values of the optical path difference functions, and the horizontal axis represents the Y-coordinate. Since the value of the optical path difference function $\phi c$ is significantly smaller than the another functions, the value thereof is shown by the scale of the right hand vertical axis, and the line showing the $\phi gc$ almost overlaps on the line showing the $\phi g$.

TABLE 1

| Y | $\phi p$ | $\phi g$ | $\phi c$ | $\phi gc$ |
|---|---|---|---|---|
| −5.000 | −424.430 | −424.960 | 2.025 | −422.935 |
| −4.500 | −343.951 | −382.464 | 1.476 | −380.988 |
| −4.000 | −271.878 | −339.968 | 1.037 | −338.931 |
| −3.500 | −208.235 | −297.472 | 0.695 | −296.777 |
| −3.000 | −153.038 | −254.976 | 0.437 | −254.539 |
| −2.500 | −106.306 | −212.480 | 0.253 | −212.227 |
| −2.000 | −68.051 | −169.984 | 0.130 | −169.854 |
| −1.500 | −38.285 | −127.488 | 0.055 | −127.433 |
| −1.000 | −17.018 | −84.992 | 0.016 | −84.976 |
| −0.500 | −4.255 | −42.496 | 0.002 | −42.494 |
| 0.000 | 0.000 | 0.000 | 0.000 | 0.000 |
| 0.500 | −4.255 | 42.496 | −0.002 | 42.494 |
| 1.000 | −17.018 | 84.992 | −0.016 | 84.976 |
| 1.500 | −38.285 | 127.488 | −0.055 | 127.433 |
| 2.000 | −68.051 | 169.984 | −0.130 | 169.854 |
| 2.500 | −106.306 | 212.480 | −0.253 | 212.227 |
| 3.000 | −153.038 | 254.976 | −0.437 | 254.539 |
| 3.500 | −208.235 | 297.472 | −0.695 | 296.777 |
| 4.000 | −271.878 | 339.968 | −1.037 | 338.931 |
| 4.500 | −343.951 | 382.464 | −1.476 | 380.988 |
| 5.000 | −424.430 | 424.960 | −2.025 | 422.935 |

[Step S5]

In the following superimposing steps S5 through S8, the actual shape of the final diffractive surface is determined based on the optical path difference functions defined in steps S1 though S4. In step S5, the beam separating diffractive surface and the coma correcting diffractive surface are superimposed at a level of the optical path difference functions. The optical path difference function $\phi gc$ of the superimposed diffractive surface is found by $\phi g + \phi c$. The value of the function $\phi gc$ is also shown in Table 1 and FIG. 3.

[Step S6]

The decimal part φgc' of the optical path difference function φgc of the superimposed diffractive surface is determined by subtracting the integral part from the function φgc as follows:

$$\phi gc'(Y, Z) = MOD((\phi g + \phi c), 1).$$

The function MOD(x, y) represents the reminder when x is divided by y, and MOD((φg+φc) 1) represents the decimal part that is difference when an integral multiple of the wavelength λ is subtracted from the optical path length defined by the function φgc.

The actual shape defined by the optical path difference function φgc is a wedge prism whose principal section is coincident with the X-Y plane. That is, the optical path difference monotonically varies along the Y-axis direction.

The actual shape of the diffractive surface defined by the decimal part φgc' has a plurality of straight band patterns that are parallel to the Z-axis and are arranged along the Y-axis direction. That is, the diffractive surface is a discontinuous surface whose section is similar to a saw blade. The boundaries between adjacent band patterns give an optical path difference by a wavelength along the X-axis direction.

In step S6, the first phase distribution φdiv is determined by mapping the decimal part φgc' on the reference phase pattern. The first phase distribution φdiv is expressed by a converting function f(x) for mapping the decimal part on the reference phase pattern.

$$\phi div = f(\phi gc'(Y, Z)) = f(MOD((\phi g + \phi c), 1))$$

The beam separating diffractive surface defined by the optical path difference function φg and the superimposed diffractive surface defined by the optical path difference function φgc can determine the distance between the focusing points, while they cannot determine a light amount distribution for the respective focusing points. Such a distribution can be determined by a shape of the reference phase pattern within the single pitch.

The actual shape of the diffractive surface having the reference phase patterns includes a plurality of straight band patterns (i.e., the reference phase patterns) that are parallel to the Z-axis and are arranged along the Y-axis direction.

The reference phase pattern is designed for separating a single beam into the intended number of beams with optimizing to satisfy conditions: (1) intensities of all separated beams are substantially the same; and (2) the incident beam is divided into only the intended number of beams.

TABLE 2 shows numerical data of the reference phase pattern that separates an incident beam into three beams (zero, first and second diffraction orders) according to the embodiment. In TABLE 2, "DPO" (designated 0.000–1.000) represents the position in the Y-axis direction when one period of the phase pattern is divided into 64 points, and "PD" represents the phase difference at the corresponding point with respect to the phase at the origin (DP=0.000). The phase difference PD is given by the unit of wavelength λ.

Figure 4:
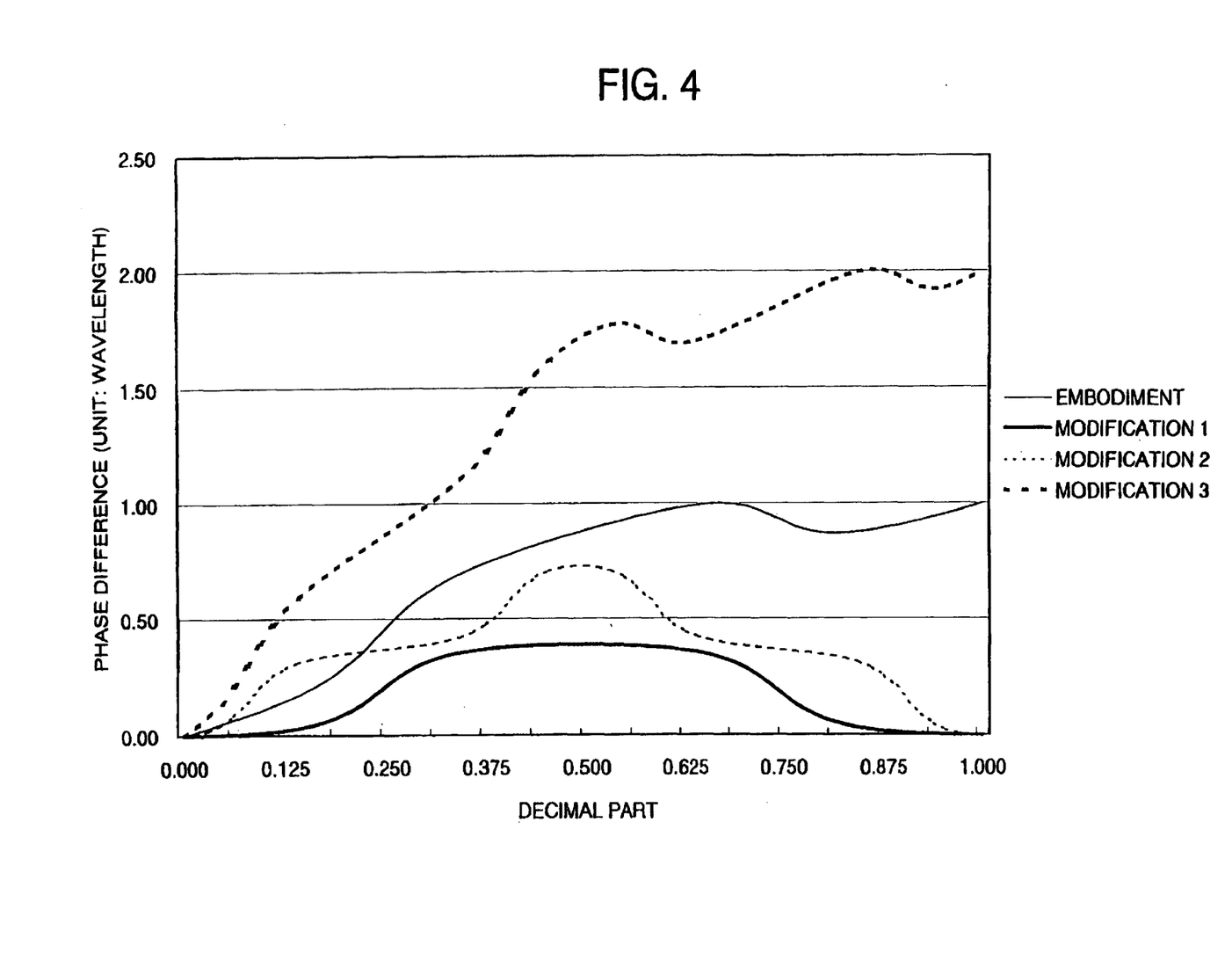
FIG. 4 is a graph showing shapes of reference phase patterns used in the design method of the embodiment.

The data of TABLE 2 is represented by a thin solid line labeled as "EMBODIMENT" in a graph of FIG. 4. The vertical axis of the graph represents the phase difference (unit: wavelength), and the horizontal axis thereof represents the position in the Y-axis direction.

TABLE 2

| DP | PD | DP | PD | DP | PD |
|---|---|---|---|---|---|
| 0.000 | 0.000 | 0.344 | 0.697 | 0.688 | 0.996 |
| 0.016 | 0.016 | 0.359 | 0.721 | 0.703 | 0.987 |
| 0.031 | 0.033 | 0.375 | 0.743 | 0.719 | 0.971 |
| 0.047 | 0.050 | 0.391 | 0.763 | 0.734 | 0.948 |
| 0.063 | 0.068 | 0.406 | 0.783 | 0.750 | 0.922 |
| 0.078 | 0.086 | 0.422 | 0.802 | 0.766 | 0.899 |
| 0.094 | 0.106 | 0.438 | 0.820 | 0.781 | 0.883 |
| 0.109 | 0.127 | 0.453 | 0.837 | 0.797 | 0.873 |
| 0.125 | 0.149 | 0.469 | 0.853 | 0.813 | 0.870 |
| 0.141 | 0.173 | 0.484 | 0.870 | 0.828 | 0.871 |
| 0.156 | 0.199 | 0.500 | 0.885 | 0.844 | 0.876 |
| 0.172 | 0.229 | 0.516 | 0.900 | 0.859 | 0.883 |
| 0.188 | 0.264 | 0.531 | 0.915 | 0.875 | 0.892 |
| 0.203 | 0.304 | 0.547 | 0.929 | 0.891 | 0.903 |
| 0.219 | 0.352 | 0.563 | 0.942 | 0.906 | 0.915 |
| 0.234 | 0.406 | 0.578 | 0.955 | 0.922 | 0.927 |
| 0.250 | 0.463 | 0.594 | 0.967 | 0.938 | 0.941 |
| 0.266 | 0.517 | 0.609 | 0.977 | 0.953 | 0.955 |
| 0.281 | 0.565 | 0.625 | 0.986 | 0.969 | 0.969 |
| 0.297 | 0.606 | 0.641 | 0.993 | 0.984 | 0.984 |
| 0.313 | 0.640 | 0.656 | 0.998 | 1.000 | 1.000 |
| 0.328 | 0.670 | 0.672 | 1.000 | | |

[Step S7]

In step S7, the decimal part φp' of the optical path difference function φp of the beam converging diffractive surface is determined by subtracting an integral multiple of the wavelength λ from the function φp as follows:

$$\phi p'(Y, Z) = MOD\left(\frac{-\sqrt{2500 + Y^2 + Z^2} + 50.0}{0.00058756}, 1\right)$$

The actual shape of the diffractive surface defined by the decimal part φp' is similar to a Fresnel lens, it is formed as a plurality of concentric rings each of which has a wedge sectional shape. The boundary between the adjacent rings is a step to give a predetermined optical path difference.

[Step S8]

In step S8, the decimal part φp' is superimposed on the first phase distribution φdiv at a level of the optical path difference functions to determine the final optical path difference function φ(Y, Z).

$$\phi(Y, Z) = \phi div + \phi p' = f(MOD((\phi g + \phi c), 1)) + MOD((\phi p, 1))$$

The actual shape of the final diffractive surface is obtained based on the optical path difference function φ(Y, Z). The shape function τ(Y, Z) is represented by the following equation on the premise that the diffractive lens is used in the air. In the equation, n denotes refractive index of material to form the diffractive lens and it is different from the refractive index $n_m$ depending on the diffraction order. λB denotes blazed wavelength.

$$\tau(Y, Z) = \phi(Y, Z) \times \lambda B/(n-1)$$

$$= (\phi div + \phi p') \times \lambda B/(n-1)$$

The diffractive lens is formed by an NC cutting machine based on the shape function τ(Y, Z). Alternatively, the shape function τ(Y, Z) may be quantized in eight levels to form the diffractive lens by the lithography method.

Further, modifications of the reference phase pattern will be described hereinafter. Replacement of the data of the reference phase pattern used in step S8 allows to use the modifications instead of the reference phase pattern of the embodiment.

TABLE 3 shows a data of the reference phase pattern that separates an incident light beam into three equal portions, that is minus-first, zero and first orders diffraction light. The data of TABLE 3 is represented by a thick solid line labeled as "MODIFICATION 1" in the graph of FIG. 4.

TABLE 3

| DP | PD | DP | PD | DP | PD |
|---|---|---|---|---|---|
| 0.000 | 0.000 | 0.344 | 0.353 | 0.688 | 0.309 |
| 0.016 | 0.000 | 0.359 | 0.361 | 0.703 | 0.284 |
| 0.031 | 0.001 | 0.375 | 0.368 | 0.719 | 0.252 |
| 0.047 | 0.003 | 0.391 | 0.373 | 0.734 | 0.213 |
| 0.063 | 0.005 | 0.406 | 0.377 | 0.750 | 0.172 |
| 0.078 | 0.008 | 0.422 | 0.380 | 0.766 | 0.133 |
| 0.094 | 0.012 | 0.438 | 0.382 | 0.781 | 0.101 |
| 0.109 | 0.017 | 0.453 | 0.384 | 0.797 | 0.076 |
| 0.125 | 0.024 | 0.469 | 0.385 | 0.813 | 0.057 |
| 0.141 | 0.032 | 0.484 | 0.385 | 0.828 | 0.043 |
| 0.156 | 0.043 | 0.500 | 0.385 | 0.844 | 0.032 |
| 0.172 | 0.057 | 0.516 | 0.385 | 0.859 | 0.024 |
| 0.188 | 0.076 | 0.531 | 0.384 | 0.875 | 0.017 |
| 0.203 | 0.101 | 0.547 | 0.382 | 0.891 | 0.012 |
| 0.219 | 0.133 | 0.563 | 0.380 | 0.906 | 0.008 |
| 0.234 | 0.172 | 0.578 | 0.377 | 0.922 | 0.005 |
| 0.250 | 0.213 | 0.594 | 0.373 | 0.938 | 0.003 |
| 0.266 | 0.252 | 0.609 | 0.368 | 0.953 | 0.001 |
| 0.281 | 0.284 | 0.625 | 0.361 | 0.969 | 0.000 |
| 0.297 | 0.309 | 0.641 | 0.353 | 0.984 | 0.000 |
| 0.313 | 0.328 | 0.656 | 0.342 | 1.000 | 0.000 |
| 0.328 | 0.342 | 0.672 | 0.328 | | |

The following TABLE 4 shows a data of the reference phase pattern that separates an incident light beam into five equal portions, that is minus-second, minus-first, zero, first and second orders diffraction light. The data of TABLE 4 is represented by a thin dot line labeled as "MODIFICATION 2" in the graph of FIG. 4.

TABLE 4

| DP | PD | DP | PD | DP | PD |
|---|---|---|---|---|---|
| 0.000 | 0.000 | 0.344 | 0.418 | 0.688 | 0.384 |
| 0.016 | 0.006 | 0.359 | 0.440 | 0.703 | 0.377 |
| 0.031 | 0.020 | 0.375 | 0.473 | 0.719 | 0.371 |
| 0.047 | 0.046 | 0.391 | 0.522 | 0.734 | 0.366 |
| 0.063 | 0.086 | 0.406 | 0.583 | 0.750 | 0.361 |
| 0.078 | 0.144 | 0.422 | 0.640 | 0.766 | 0.355 |
| 0.094 | 0.205 | 0.438 | 0.681 | 0.781 | 0.349 |
| 0.109 | 0.253 | 0.453 | 0.706 | 0.797 | 0.343 |
| 0.125 | 0.286 | 0.469 | 0.720 | 0.813 | 0.334 |
| 0.141 | 0.308 | 0.484 | 0.726 | 0.828 | 0.323 |
| 0.156 | 0.323 | 0.500 | 0.726 | 0.844 | 0.308 |
| 0.172 | 0.334 | 0.516 | 0.720 | 0.859 | 0.286 |
| 0.188 | 0.343 | 0.531 | 0.706 | 0.875 | 0.253 |
| 0.203 | 0.349 | 0.547 | 0.681 | 0.891 | 0.205 |
| 0.219 | 0.355 | 0.563 | 0.640 | 0.906 | 0.144 |
| 0.234 | 0.361 | 0.578 | 0.583 | 0.922 | 0.086 |
| 0.250 | 0.366 | 0.594 | 0.522 | 0.938 | 0.046 |
| 0.266 | 0.371 | 0.609 | 0.473 | 0.953 | 0.020 |
| 0.281 | 0.377 | 0.625 | 0.440 | 0.969 | 0.006 |
| 0.297 | 0.384 | 0.641 | 0.418 | 0.984 | 0.000 |
| 0.313 | 0.392 | 0.656 | 0.403 | 1.000 | 0.000 |
| 0.328 | 0.403 | 0.672 | 0.392 | | |

The following TABLE 5 shows a data of the reference phase pattern that separates an incident light beam into five equal portions, that is zero, first, second, third and fourth orders diffraction light. The data of TABLE 5 is represented by a thick dot line labeled as "MODIFICATION 3" in the graph of FIG. 4.

TABLE 5

| DP | PD | DP | PD | DP | PD |
|---|---|---|---|---|---|
| 0.000 | 0.000 | 0.344 | 1.105 | 0.688 | 1.759 |
| 0.016 | 0.037 | 0.359 | 1.159 | 0.703 | 1.783 |
| 0.031 | 0.083 | 0.375 | 1.223 | 0.719 | 1.809 |
| 0.047 | 0.139 | 0.391 | 1.303 | 0.734 | 1.834 |
| 0.063 | 0.211 | 0.406 | 1.395 | 0.750 | 1.861 |
| 0.078 | 0.300 | 0.422 | 1.484 | 0.766 | 1.887 |
| 0.094 | 0.392 | 0.438 | 1.556 | 0.781 | 1.912 |
| 0.109 | 0.472 | 0.453 | 1.612 | 0.797 | 1.936 |
| 0.125 | 0.536 | 0.469 | 1.658 | 0.813 | 1.959 |
| 0.141 | 0.590 | 0.484 | 1.695 | 0.828 | 1.980 |
| 0.156 | 0.636 | 0.500 | 1.726 | 0.844 | 1.996 |
| 0.172 | 0.678 | 0.516 | 1.751 | 0.859 | 2.005 |
| 0.188 | 0.718 | 0.531 | 1.768 | 0.875 | 2.003 |
| 0.203 | 0.756 | 0.547 | 1.774 | 0.891 | 1.986 |
| 0.219 | 0.793 | 0.563 | 1.765 | 0.906 | 1.956 |
| 0.234 | 0.829 | 0.578 | 1.739 | 0.922 | 1.930 |
| 0.250 | 0.866 | 0.594 | 1.709 | 0.938 | 1.921 |
| 0.266 | 0.902 | 0.609 | 1.692 | 0.953 | 1.927 |
| 0.281 | 0.939 | 0.625 | 1.690 | 0.969 | 1.944 |
| 0.297 | 0.977 | 0.641 | 1.699 | 0.984 | 1.969 |
| 0.313 | 1.017 | 0.656 | 1.715 | 1.000 | 2.000 |
| 0.328 | 1.059 | 0.672 | 1.736 | | |

The present disclosure relates to the subject matter contained in Japanese Patent Application No. HEI 10-350387, filed on Dec. 9, 1998, which is expressly incorporated herein by reference in its entirety.

What is claimed is:

1. A method for designing a diffractive lens having a combination of a plurality of optical functions, said method comprising:
    defining an expression of each of a plurality of diffractive surfaces, said plurality of diffractive surfaces having said plurality of optical functions, respectively; and
    superimposing the defined expressions of said plurality of diffractive surfaces to determine a shape of said diffractive lens, a diffractive lens formed to have said shape having said combination of said plurality of optical functions.

2. The method according to claim 1, wherein said expression of each of said diffractive surfaces represents a phase distribution.

3. The method according to claim 1, wherein said expression of each of said diffractive surfaces represents an actual shape.

4. The method according to claim 1, wherein said optical functions include a beam converging function and a beam separating function.

5. The method according to claim 4, wherein said optical functions further include an aberration correcting function.

6. A method for designing a diffractive lens that separates an incident light beam into a plurality of beams and condenses the respective separated beams, said method comprising:
    defining an expression of a diffractive surface having a beam converging function based on given focal length;
    defining an expression of a diffractive surface having a beam separating function that separates a light beam into plural orders of diffractive light based on said given focal length, a given number of separated light and a given distance between focusing points;
    superimposing the defined expressions of said diffractive surface having said beam converging function and said diffractive surface having said beam separating function to determine a shape of said diffractive lens having a plurality of optical functions.

7. The method according to claim 6, wherein said superimposing step further includes:

calculating a first phase distribution by mapping decimal parts of an optical path difference function, which is expressed in the unit wavelength and represents the defined expression of said diffractive surface having said beam separating function, on a reference phase pattern that represents a variation of phase shifting amount within one pitch to separate a light beam into a plurality of equal portions;

calculating a second phase distribution that corresponds with decimal parts of an optical path difference function, which is expressed in the unit wavelength and represents the defined expression of said diffractive surface having said beam converging function; and calculating the shape of said diffractive lens by superimposing said first and second phase distributions and converting the superimposed result into said actual shape.

8. The method according to claim 6, further comprising defining an expression of a diffractive surface having an aberration correcting function that corrects aberration at the respective focusing points caused when said diffractive surfaces having said beam converging function and said beam separating function are superimposed, and wherein the expressions of the diffractive surfaces having said beam converging function, said beam separating function and said aberration correcting function are superimposed in said superimposing step to define the final shape of said diffractive lens.

9. The method according to claim 8, wherein said expression of said diffractive surface having said aberration correcting function is defined to correct at least coma.

* * * * *